(12) United States Patent
Angel et al.

(10) Patent No.: US 6,186,677 B1
(45) Date of Patent: *Feb. 13, 2001

(54) BYTE CODE INSTRUMENTATION

(75) Inventors: David J. Angel, Hudson; Farokh Morshed, Amherst; David A. Seidel, Peterborough, all of NH (US)

(73) Assignee: Compuware Corporation, Farmington Hills, MI (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 09/066,988

(22) Filed: Apr. 23, 1998

Related U.S. Application Data

(63) Continuation-in-part of application No. 08/916,125, filed on Aug. 21, 1997.
(60) Provisional application No. 60/045,018, filed on Apr. 28, 1997, provisional application No. 60/024,624, filed on Aug. 27, 1996, and provisional application No. 60/036,250, filed on Jan. 24, 1997.

(51) Int. Cl.[7] .............................. G06F 9/44; G06F 11/00
(52) U.S. Cl. .................... 395/704; 395/707; 395/708; 714/35; 714/38; 714/45; 714/48
(58) Field of Search .................................. 395/704, 707, 395/709, 708, 705; 714/35, 38, 45, 48

(56) References Cited

U.S. PATENT DOCUMENTS

| | | | |
|---|---|---|---|
| 4,667,290 | 5/1987 | Goss et al. | 395/707 |
| 4,775,932 | 10/1988 | Oxley et al. | 707/206 |
| 5,175,856 | 12/1992 | Van Dyke et al. | 395/704 |
| 5,193,180 | 3/1993 | Hastings | 395/710 |
| 5,274,811 | 12/1993 | Borg et al. | 395/704 |
| 5,276,881 | 1/1994 | Chan et al. | 395/707 |
| 5,280,613 | 1/1994 | Chan et al. | 395/707 |
| 5,335,344 | 8/1994 | Hastings | 395/183.11 |
| 5,339,419 | 8/1994 | Chan et al. | 395/707 |
| 5,355,492 | * 10/1994 | Frankel et al. | 395/707 |

(List continued on next page.)

OTHER PUBLICATIONS

Steffen, Joseph L., *Software —Practice and Experience*, "Adding Run–time Checking to the Protable C Compiler", John Wiley & Sons, Ltd., vol. 22(4), 305–316, Apr. 1992.
Nu–Mega Technologies, Inc. (Company Literature), *Bounds–Checker User's Guide* ,, Chapter 6, "Customizing Data Checking with Routine–Dat", pp. 75–83, Date Not Available.

(List continued on next page.)

Primary Examiner—Eric W. Stamber
Assistant Examiner—Tuan Q. Dam
(74) Attorney, Agent, or Firm—Hutchins, Wheeler & Daittmar

(57) ABSTRACT

Instrumenting a computer program to provide instrumented byte code includes examining an initial intermediate representation of the program, selecting portions of the initial intermediate representation for instrumentation, and instrumenting the portions. Selecting the portions may include choosing portions of the initial intermediate representation corresponding to pointer arithmetic operations, operations that reads memory locations, operations that change memory locations, and/or operations that causes program variables to become defined or undefined within the program. Instrumenting the portions may include adding run time code that provides a user with an indication when a run time error occurs. The portions may subsequently be converted to byte code.

17 Claims, 10 Drawing Sheets

U.S. PATENT DOCUMENTS

| | | | | |
|---|---|---|---|---|
| 5,367,685 | * | 11/1994 | Gosling | 395/707 |
| 5,450,586 | * | 9/1995 | Kuzara et al. | 717/4 |
| 5,493,675 | | 2/1996 | Faiman, Jr. et al. | 395/709 |
| 5,528,753 | | 6/1996 | Fortin . | |
| 5,535,329 | | 7/1996 | Hastings | 395/183.11 |
| 5,581,696 | | 12/1996 | Kolawa et al. | 395/183.14 |
| 5,583,988 | | 12/1996 | Crank et al. | 395/185.01 |
| 5,613,063 | * | 3/1997 | Eustace et al. | 714/38 |
| 5,664,191 | * | 9/1997 | Davidson et al. | 709/100 |
| 5,732,273 | * | 3/1998 | Srivastava et al. | 395/704 |
| 5,734,908 | * | 3/1998 | Chan et al. | 395/709 |
| 5,790,858 | * | 8/1998 | Vogel | 395/704 |
| 5,987,249 | * | 11/1999 | Grossman et al. | 717/4 |
| 6,016,466 | * | 1/2000 | Guinther et al. | 702/187 |
| 6,085,029 | * | 9/2000 | Kolawa et al. | 714/38 |

OTHER PUBLICATIONS

Austin, Todd M. et al., "Efficient Detection of All Pointer and Array Access Errors", University of Wisconsin–Madison, Computer Sciences Department, Madison, WI, Dec. 1, 1993.

J. Long et al., "Compiler–Assisted Statis Checkpoint Insertion", 1992 International F–T Symposium, IEEE.

X. Nicollin et al., "Compiling Real–Time Specifications into Extended Automata", *IEEE Transactions on Software Engineering*, vol . 18, No. 9, Sep. 1992.

P.B. Kessler, "Fast Breakpoints: Design and Implementation", Proceedings of the ACM SIGPLAN '90 Conference on Programming Language Design and Implementation, White Plains, NY, Jun. 20–22, 1990.

D.W. Wall, "Link–Time Code Modification", *WRL Research Report 89/17*, Sep. 1989.

F.L. Bauer et al., "Lecture Notes in Computer Science, Compiler Construction —An Advanced Course", Springer–Verlag, Berlin, Heidelberg, New York, 1974.

"Runtime Debugger" Parasoft Corporation. *The Florida Sunflash,* vol. 63, No. 22, Mar. 1994.

Object Trace™—ObjectSoftware, Inc. Product Literature.

Aho, Alfred V., *Compilers, Principles, Techniques, and Tool,* Addison–Wesley, 1986 by Bell Telephone Laboratories, Incorporated, pp. 464–465, 438–441.

* cited by examiner

BYTE CODE INSTRUMENTATION

CROSS-REFERENCE TO RELATED APPLICATIONS

This application is based on U.S. Provisional Patent Application No. 60/045,018 filed on Apr. 28, 1997 and is a continuation-in-part of pending U.S. patent application Ser. No. 08/916,125, filed on Aug. 21, 1997, which is based on U.S. Provisional Patent Applications Nos. 60/024,624 and 60/036,250 filed on Aug. 27, 1996 and Jan. 24, 1997, respectively.

BACKGROUND OF THE INVENTION

1. Field of the Invention

This application relates to the field of computer software and more particularly to the field of computer software for instrumentation of code in order to facilitate debugging.

2. Description of Related Art

Code instrumentation is performed by adding statements to software in order to monitor performance and operation of the software during run time. Code instrumentation is sometimes used to facilitate debugging of run time errors relating to memory accesses. Specifically, since many run time errors are the result of improperly accessing or using memory (e.g., writing beyond an array's boundaries, not freeing dynamically allocated memory, etc.), then instrumentation may be used to supplement memory accessing portions of the software with additional software that monitors memory accesses and provides an indication when it appears that an improper access has occurred.

Instrumentation may be performed manually by having the programmer insert source code statements that intermittently output or record values related to memory variables, such as array indices and amounts of free space left in the allocation heap. However, such manual instrumentation is often inefficient for a number of reasons. Manual instrumentation requires the programmer to recognize possible sources of error in order to be able to insert the appropriate source code to perform the instrumentation. However, once the programmer has identified possible sources of error, it may be more straight-forward to simply examine the potentially errant code and fix the error rather than perform the additional steps associated with adding source code instrumentation statements. In addition, manually adding source code instrumentation statements requires repeated recompiling of the source code before execution, which adds time and effort to the debugging process. Also, the programmer must remember which statements are instrumentation statements in order to remove those statements once the added debugging statements are no longer needed.

Various systems exists for automating the debugging process. U.S. Pat. No. 5,581,696 to Kolawa et. al (the '696 patent) is directed to a method of using a computer for automatically instrumenting a computer program for dynamic debugging. In the system disclosed in the '696 patent, the instrumentation software examines and supplements a parse tree intermediate stage produced by the compiler. The parse tree is a tree having nodes corresponding to tokens that represent individual source code statements. The system described in the '696 patent traverses the parse tree to locate tokens of interest (e.g., tokens corresponding to memory accesses) and supplements those tokens with additional tokens corresponding to code that monitors the memory accesses. However, since the contents of the parse tree depend upon the particular source programming language used, the system disclosed in the '696 patent is also source dependent.

U.S. Pat. Nos. 5,193,180, 5,335,344, and 5,535,329 all to Hastings (the Hastings patents), disclose a system for instrumenting computer object code to detect memory access errors. The instrumentation includes providing additional code that maintains the status of each and every program memory location along with supplementing object code instructions that access the program memory with additional code that facilitates maintaining status of the memory locations. To the extent that the object code is independent of the particular source code that is used, the system disclosed in the Hastings patents is also independent of the source code language used.

However, since the system disclosed in the Hastings patents involves modifying object code, then the system is target dependent in that it may only be configured to work with object code that executes a particular target processor's native language. Although it may be desirable to adapt the Hastings system to work with object code for a variety of target processors, such an adaptation would require significant modifications to the system since object code instructions that access memory may vary significantly between different target processor languages. In addition, monitoring program memory accesses by maintaining the status of program memory locations allows some improper operations to be performed by the software without being detected. For example, reading a memory location beyond an array's boundaries may not be detected if the memory location that is read has been allocated and initialized in connection with another memory variable.

Other systems for facilitating debugging exist. For example, U.S. Pat. No. 4,667,290 to Goss et al. is directed to compilers that create intermediate representation (IR) code that is both source and target independent. Column 5, lines 57–60 disclose using the IR code to facilitate debugging by retaining portions of the IR code that would otherwise be eliminated in the course of optimization if debugging is not being performed. Similarly, U.S. Pat. No. 5,175, 856 to Van Dyke et al. discloses a compiler that produces an IR code where debugging is facilitated by passing information through the intermediate code file.

U.S. Pat. Nos. 5,276,881, 5,280,613, and 5,339,419, all to Chan et al., disclose a compiler system that produces an IR code. U.S. Pat. No. 5,276,881 is illustrative of the three patents and discloses symbolic debugging support provided in connection with the compiler system described in the patent. Column 59, lines 15–19 indicate that if the symbolic debug option is specified, " . . . then the Low-level Code Generator 1322 writes additional information to the Low Level CIR 1338.". (CIR is an acronym for Compiler Intermediate Representation.) Column 57, lines 59–63 indicate that the Low-Level CIR 1338 is analogous to the compiler intermediate representation 212, but the low level CIR 1338 is not architecturally neutral (i.e., is target dependent). Column 57, lines 63–65 state specifically that the Low-Level CIR 1338 is dependent upon the particular architecture of the target computer platform.

Thus, none of the references that disclose use of IR code in connection with compilers appear to directly address the difficulties presented by the '696 patent and the Hasting patents, discussed above.

SUMMARY OF THE INVENTION

According to the present invention, instrumenting a computer program includes examining an initial intermediate representation of the program, selecting portions of the initial intermediate representation for instrumentation, instrumenting the portions, and converting the instrumented portions into byte code. Selecting the portions may include choosing portions of the initial intermediate representation corresponding to pointer arithmetic operations, operations that reads memory locations, operations that change memory locations, and/or operations that causes program variables to become defined or undefined within the program. Instrumenting the portions may include adding run time code that provides a user with an indication when a run time error occurs. Converting the instrumented portions may include transforming the insumented IR code into byte code Instrumenting a computer program may also include creating an IR tree of nodes corresponding to IR operations and operands of the initial intermediate representation where the nodes being interconnected according to a logical relationship between the operators and the operands and where instrumenting the portions includes modifying the IR tree. Instrumenting may also include transforming the IR tree into an instrumented intermediate representation that is structurally equivalent to the initial intermediate representation. The IR tree may include nodes that are interconnected so that children nodes of an operator are the operands of the operator. The IR tree may be created by placing the children nodes on a local stack and then popping the children nodes off the local stack to connect the children nodes to parent nodes.

Instrumenting a computer program may also include creating an effective scope table that correlates a unique scope ID for each block of IR code contained within the initial intermediate representation to an effective scope ID that indicates whether new program variables are defined within a each block of IR code, and, in response to a first block of the IR code having a first effective scope ID not equal to a second effective scope ID of a second block of the IR code that immediately precedes the first block of the IR code, selecting for instrumentation a portion of the IR code corresponding to a transition between the first and second blocks. Instrumenting a computer program may also include creating an effective scope table that correlates a unique scope ID for each block of IR code contained within the initial intermediate representation to an effective scope ID that indicates whether new program variables are defined within a each block of IR code, and, in response to a first block of the IR code containing a label and having associated therewith a first effective scope ID not equal to a second effective scope ID of a second block of the IR code containing a control flow instruction to the label, selecting for instrumentation a portion of the IR code corresponding to a transition between the control flow instruction and the label.

According further to the present invention, instrumenting a computer program includes examining an initial intermediate representation of the program, creating an IR tree of nodes corresponding to IR operations and operands of the initial intermediate representation, the nodes being interconnected according to a logical relationship between the operators and the operands, selecting portions of the initial intermediate representation for instrumentation, instrumenting the portions by modifying the IR tree with run time instrumentation code, and using the IR tree to create an instrumented intermediate representation that is structurally equivalent to the initial intermediate representation.

Instrumenting the intermediate representation provides a mechanism for instrumenting a program in essentially the same manner regardless of the source language or target processor used. Thus, the system may be adapted to a variety of source languages and target processors. In addition, unlike systems that instrument object code, the system described herein instruments memory variable accesses rather than monitoring program memory only. Thus, the system described herein is capable of detecting a run time memory error in which a first variable reads from or writes to the memory area of a second variable, even if the memory area has been properly allocated and/or initialized by the second variable. For the embodiments that instrument control flow instructions and scope changes, it is possible to perform optimizations in which unnecessary control flow or scope change operations are not instrumented, thus facilitating execution of the instrumented run time code.

DETAILED DESCRIPTION OF THE PREFERRED EMBODIMENT(S)

Figure 1:
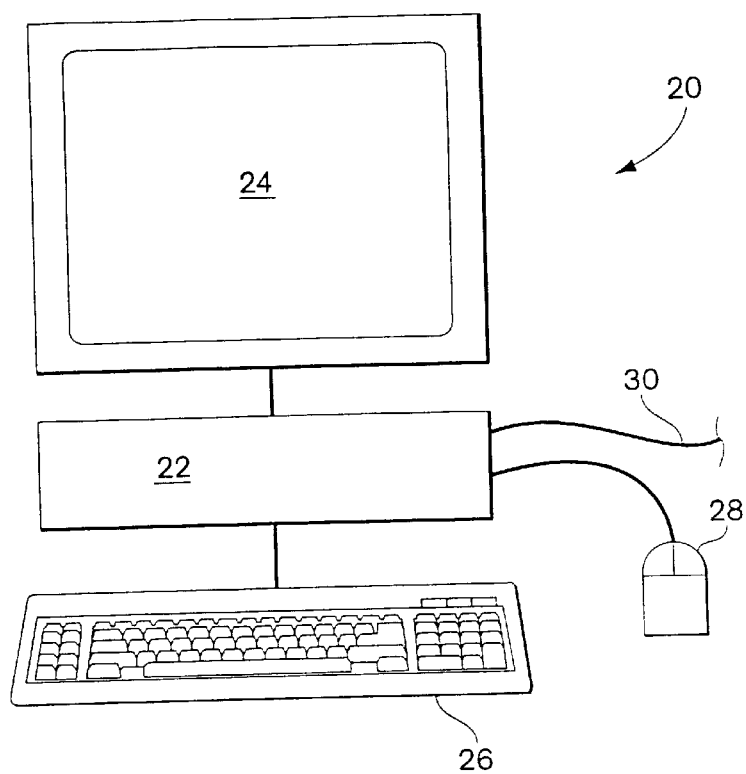
FIG. 1 shows a computer system that may be used to implement IR code instrumentation according to the present invention.

Referring to FIG. 1, a computer system 20 includes a processor 22, a display unit 24, a keyboard 26 and (optionally) a mouse input device 28. The user provides input to the processor 22 via the keyboard 26 and the mouse 28 and views output from the processor 22 via the display unit 24. The computer system may be a model P5-166 manufactured by Gateway Computer of Sioux City, S. Dak.

The computer system 20 may include a connection 30 to a conventional computer network (not shown), such as the Microsoft NT network. The computer system 20 may receive data and/or other network services, in a conventional manner, through the connection 30 to the network. The processor 22 may include conventional local storage or may use conventional storage available on the network wherein the processor 22 sends and receives data to and from the network via the network connection 30. The computer system 20 may use a combination of local storage and network storage in a conventional manner. In the discussion that follows, no specific reference is made to the type of storage device (i.e., local, network, or a combination thereof) since the system described herein does not depend on the type of computer data storage used.

Figure 2:
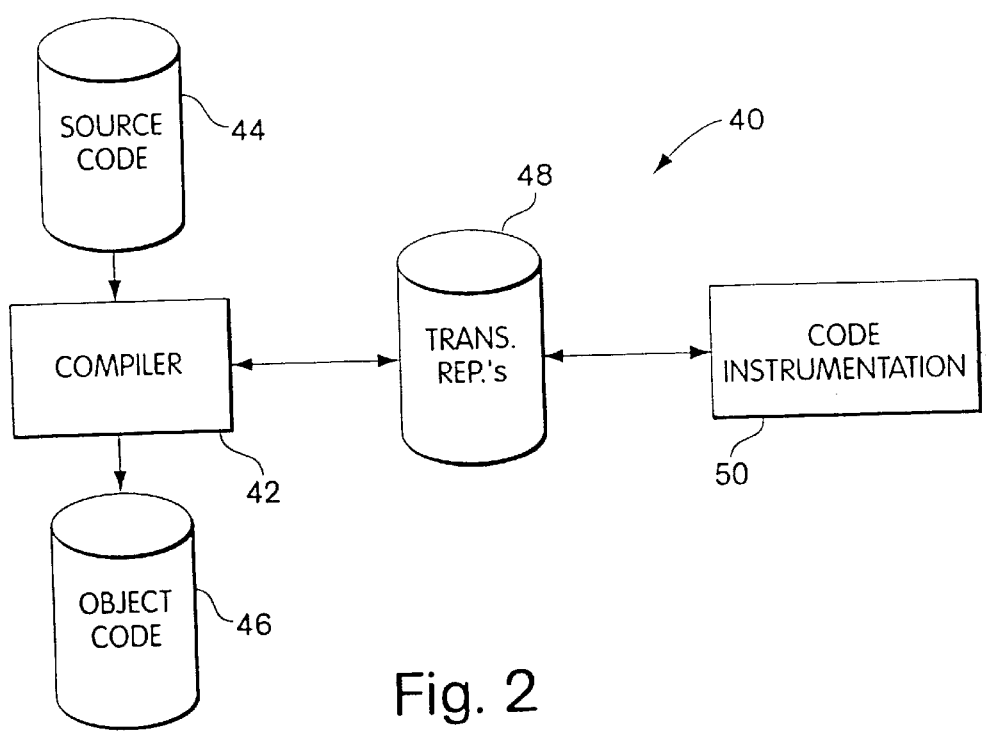
FIG. 2 is a data flow diagram illustrating a compiler operating in conjunction with IR code instrumentation according to the present invention.

Referring to FIG. 2, a data flow diagram 40, illustrates relationships between various executable code and data segments stored using the storage device of the processor 22. A software compiler 42 includes executable code that converts data representing computer source code 44 into data representing computer object code 46. The compiler 42 may be any one of a variety of conventional, commercially available, software compilers, such as the Microsoft C++ compiler manufactured by Microsoft Corporation of Redmond, Wash. If the compiler 42 is a C++ compiler, then the source code 42 represents C++ source code information entered by a user in a conventional manner such as, for example, entering the C++ source code statements into a text file in the computer system 20 using the keyboard 26 and mouse 28. The source code 44 may also be generated by any one of a variety of alternative techniques, such as other conventional, commercially available software that automatically generates the source code 44.

The object code 46 includes low-level code that is executable on a target processor (not shown). Accordingly, the object code 46 is target-specific. Note that the target processor may be the same type of processor as the processor 22 used in the computer system 20 or, alternatively, the target processor may be a different processor. The object code 46 is provided by the compiler 42 in a conventional manner.

In the course of compiling the source code 44 into object code 46, the compiler 42 may generate a plurality of transitional representations 48 that correspond to intermediate stages of the compile process. The transitional representations 48 may include a plurality of (usually temporary) data files that are created and accessed by the compiler 42. Each stage of the compiler 42 may access and/or create a particular one of the transitional representations that is provided by the previous stage of the compiler 42. Features of some of the transitional representations 48 are described in more detail hereinafter.

Code instrumentation software 50, that executes on the processor 22, accesses the transitional representations 48 and adds instrumentation instructions that ultimately provide instrumentation functionality to the object code 46. When the object code 46 is executed, the thus-added instrumentation functionality facilitates debugging in a manner described in more detail hereinafter.

Figure 3:
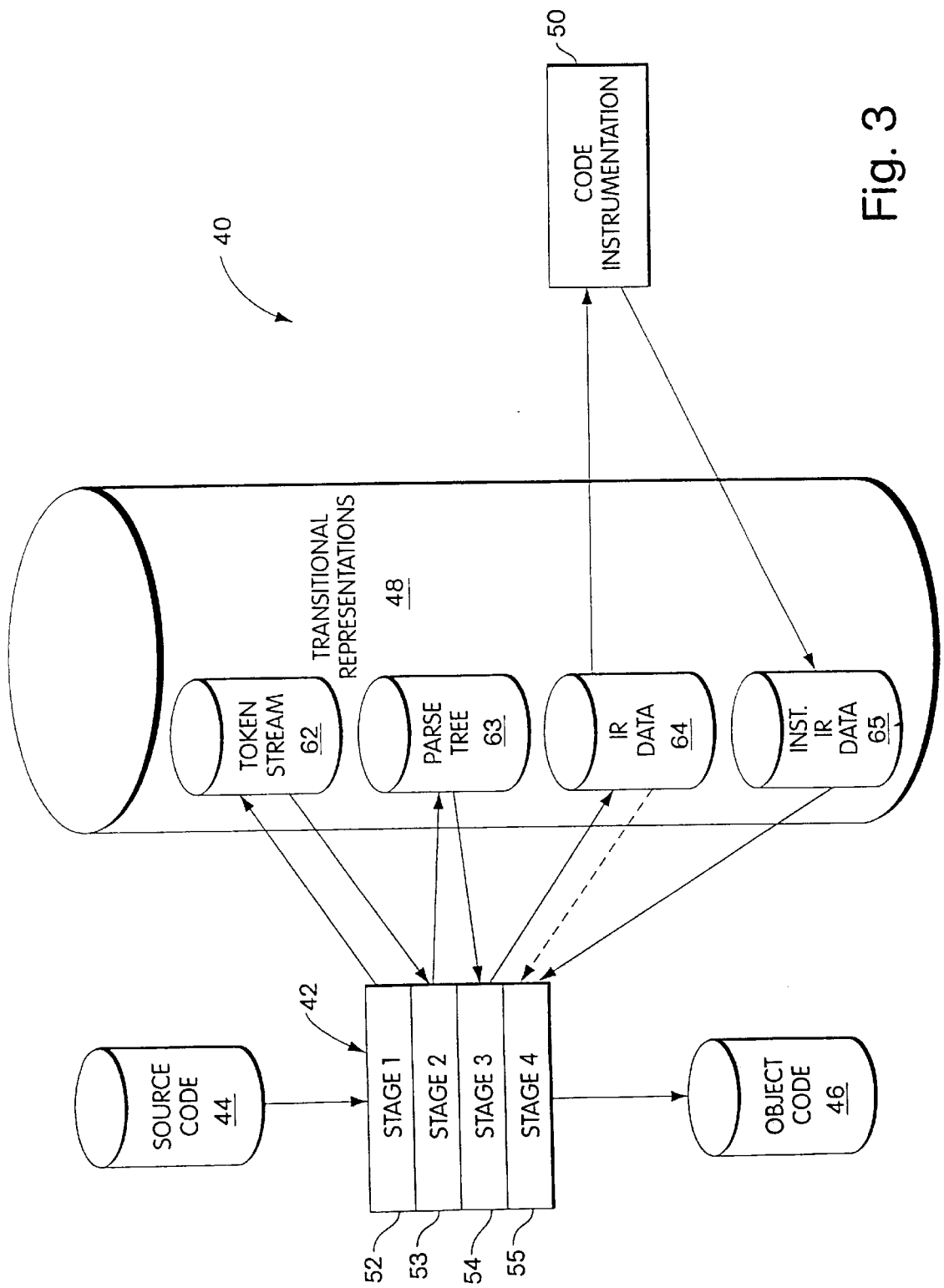
FIG. 3 is a data flow diagram illustrating interaction between various stages of the compiler and the IR code instrumentation according to the present invention.

Referring to FIG. 3, the data flow diagram 40 of FIG. 2 is illustrated with additional details included for the compiler 42 and for the transitional representation 48. The compiler 42 is shown herein as having four stages 52–55 that each perform a different phase in the process of transforming the source code 44 into the object code 46. The transitional representations 48 are shown as including various data elements that are created and/or accessed by the compiler 42. Note that other compilers may have more or less stages and that portions of the transitional representations 48 may be stored in a file, a computer memory, a combination thereof, or a variety of other means for maintaining computer data.

For the embodiment illustrated herein, the first stage 52 of the compiler 42 accesses the source code 44 and, in a conventional manner, converts the source code into tokens stored in a token stream data element 62. The token stream data element 62 contains symbols that represent individual source code statements. The symbols may be ordered according to the order of source code statements in the source code 44. The token stream 62 is provided to the second stage 53 of the compiler 42, which, in a conventional manner, converts the tokens from the token stream data element 62 into data stored in a parse tree data element 63. The parse tree data element 63 is a tree-like data structure that is constructed in a conventional manner using nodes corresponding to tokens from the token stream data element 62 that are interconnected in a directed graph according to entry and exit points of portions of the source code.

The parse tree data element 63 is provided to the third stage 54 of the compiler 42 which uses the data from the parse tree data element 63 to produce Intermediate Representation (IR) data that is stored in an IR data element 64. As described in more detail hereinafter, the IR data element 64 contains an intermediate representation of the program that is independent of the particular language used for the source code 44 and is also independent of the target processor on which the object code 46 will execute.

The fourth stage 55 of the compiler 42 converts IR data from the IR data element 64 into the object code 46. Without the code instrumentation unit 50, the fourth stage 55 of the compiler 42 could access the IR data element 64 (as indicated by the dashed line connecting the IR data element 64 to the fourth stage 55) and convert IR data from the IR data element 64 into the object code 46. However, in the system described herein, the IR data element 64 is provided to the code instrumentation 50 which, in a manner described in more detail below, instruments the IR data element 64 to provide an instrumented IR data element 65. In the system described herein, the fourth stage 55 of the compiler 42 accesses the instrumented IR data element 65 to provide the object code 46. Note that since the IR data element 64 and the instrumented IR data element 65 have the same basic structure, it is virtually transparent to the fourth stage 55 of the compiler 42 that the instrumented IR data element 65, instead of the IR data element 64, is being accessed to create the object code 46.

The IR data element 64 and the instrumented IR data element 65 contain conventional IR data that is both source and destination independent. The IR data represents the logical flow and operation of the program independent of the particular source code that is used in the source program to describe the logical flow and operation. In addition, the IR data is independent of the specific form of the object code (i.e., the specific target processor). Such IR data is well known in the prior art and will not be described in detail herein except as necessary to describe the invention.

Figure 4:
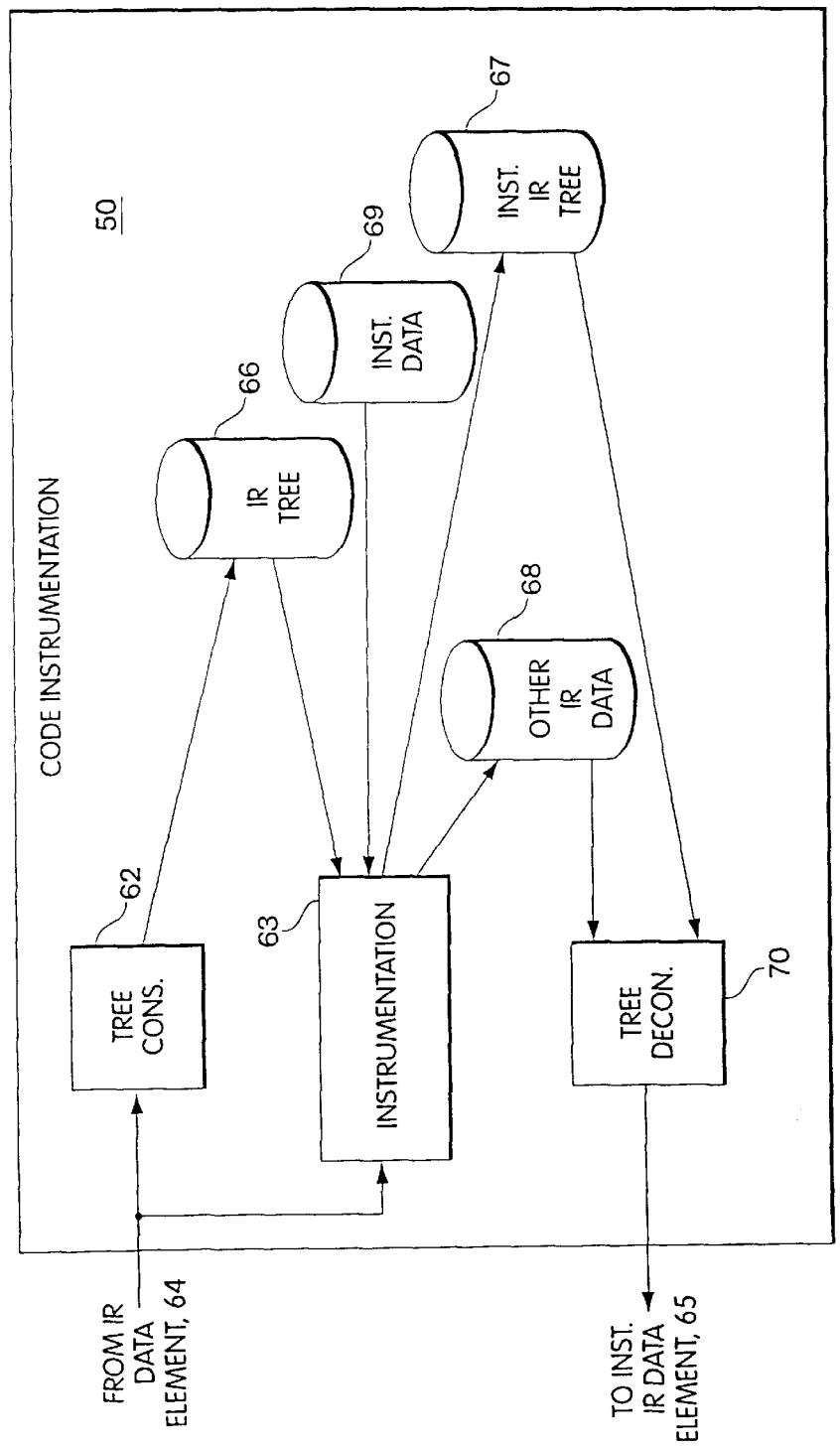
FIG. 4 is a data flow diagram illustrating in detail operation of the software for IR instrumentation.

Referring to FIG. 4, the code instrumentation 50 includes tree construction software 62 for constructing an IR tree, instrumentation software 63 for instrumenting both the IR tree and other IR data, and tree deconstruction software 70 for converting the thus-instrumented IR tree and other IR data into the instrumented IR data element 65. The tree construction software 62 receives input from the IR data element 64 and, in a manner described in more detail below, constructs an IR tree to provide to an IR tree data element 66. The instrumentation software 63 uses the IR tree data element 66 and other IR data from the IR data element 64 to provide an instrumented IR tree 67 and other IR data 68.

The instrumentation software 63 may also be provided with instrumentation data from an instrumentation data element 69. The instrumentation data element 69 may contain run time instrumentation routines and other IR data that is inserted by the instrumentation software 63 into the instrumented IR tree data element 67, the other IR data 68, or a combination thereof. The instrumentation software 63 and the instrumentation data element 69 are described in more detail hereinafter. The tree deconstruction software 70 uses the instrumented IR tree data element 67 and the other IR data 68 to create the instrumented IR data element 65. The tree deconstruction software 70 is described in more detail hereinafter.

The IR data consists of a plurality of operations and operands that correspond to the logic of the underlying source computer program. Note that the terms "operation" and "operand" may be defined broadly in this instance to include any type of statements found within IR data, including program transition statements such as call and goto, and static information such as line numbers. An operand can be a simple operand (e.g., a single variable or constant) or can be a complex operand (e.g., an expression) that corresponds to additional suboperations and operands. For example, IR data may indicate that the left side of an expression is to be set equal to the right side of an expression. The left side of the equation could be a single variable (i.e., a simple operand). The right side of the equation could also be simple operand (e.g., a constant) or could be a complex operand (e.g., an expression) that must be further evaluated in the context of additional operators and operands (e.g., addition of two variables).

Note that the IR data is both source language independent and target machine independent so that, for example, a source code statement written in a first source language could generate IR data that is identical to a programatically equivalent source language statement in a second source language if the underlying operations are identical. Similarly, a particular set of IR data can be converted by a compiler into many different object codes depending on the target machine. Although a specific IR representation may be particular to a specific compiler manufacturer, IR data and IR representations are generally known in the art. See, for example, a section titled "Graphical Representations" at pages 464–465 of Aho, Seth & Ullman, *Compilers, Principles, Techniques, and Tools*, published by Addison-Wesley of Reading Mass., 1986.

Figure 5:
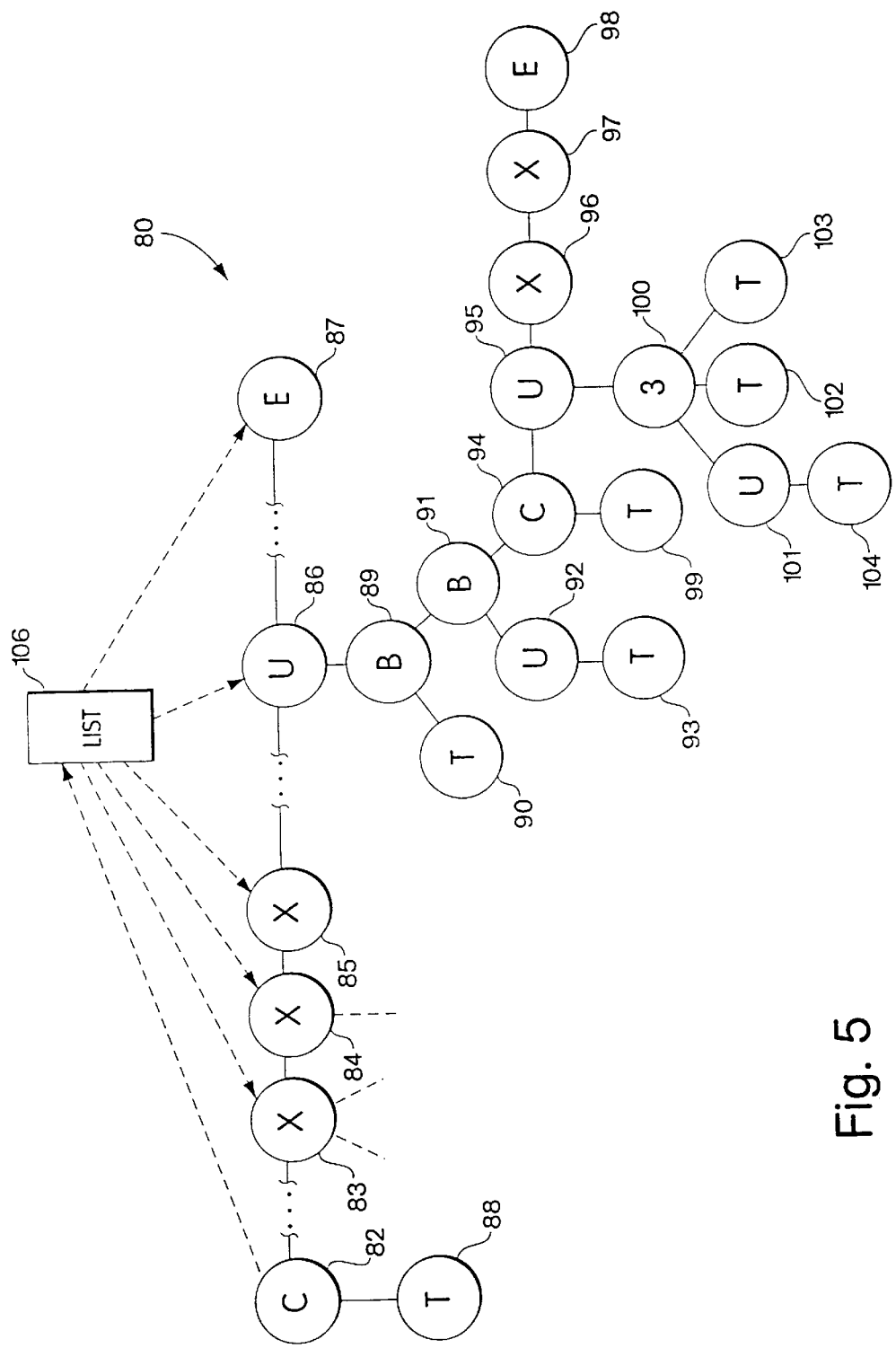
FIG. 5 illustrates a tree data structure corresponding IR code operators and operands.

Referring to FIG. 5, a tree 80 corresponds to the IR tree data element 66 provided by the tree construction software 62 shown in FIG. 4 and discussed above. The tree 80 includes a plurality of nodes 82–104. The nodes 82–104 have different types and are labeled according to type as follows:

T: terminal node
U: unary node
B: binary node
3: ternary node
C: combination node
E: end of list indicator node
X: indeterminate node, one of the above listed types of nodes The terminal nodes 88, 90, 93, 99, 102–104 are nodes of the tree 80 having no children. The unary nodes 92, 95, and 101 have only one child. The binary nodes 89, 91 have two children. The ternary node 100 has three children. The combination nodes 82, 94 have two children wherein one of the children is a list terminated by the end of list nodes 87, 98. The indeterminate nodes 83–85, 96, 97 represent nodes that could be any one of the other types of nodes and have been included in the tree 80 to facilitate illustration of the structure of the tree 80.

Each of the nodes 82–104 represents an IR operation and/or an IR operand within the IR data. For any particular one of the nodes 82–104, the children thereof represent the operators and the operands used to evaluate the parent. For example, the binary node 89 could represent an operation having two operands corresponding to the two children of the binary node 89: the terminal node 90 and the binary node 91. The terminal node 90 does not have any children and thus may correspond to a simple operand (e.g., a constant). The binary node 91 is a complex operand having children (the unary node 92 and the combination node 94) which are evaluated in order to evaluate the complex operand represented by the binary node 91.

For the combination nodes 82, 94, the attached list elements are shown as being linked together so that, for example, the node 83 is shown being linked to the node 84 and the node 84 is shown as being linked to the node 85. Another possible way to construct the list is to have the combination node 82 point to a separate list data structure 106 that contains pointers to the remaining nodes 83–87 that represent elements of the list. In that case, there would be no need for the connections between members of the list so that the node 83 would not contain a pointer to the node 84, nor would the node 84 contain pointers to the nodes 83, 85, nor would the node 85 contain a pointer to the node 84. The advantage of such a construction is that none of the nodes 83–87 would use extra storage space for pointers to the peers thereof. Of course, separately constructing the list 106 may add complexity and possibly additional processor time in connection with manipulating the combination node 82. Note that irrespective of whether the list nodes 83–87 are connected peer to peer or are simply pointed to by the separate list 106, the end of list may conveniently be indicated by the end of list node 87.

The tree 80 illustrates that the underlying program corresponding to the IR data can be represented as a list of root nodes of a plurality of subtrees. That is, the program may be represented by a list of nodes 82–87 that correspond to root nodes of a plurality of subtrees. Of course, some of these subtrees may simply have a root node without substructure while other subtrees, such as the subtree emanating from the node 86, may have a more involved structure. Note also that, in some embodiments, the tree 80 may represent a single function among a plurality of functions contained in the IR data element 64.

Figure 6:
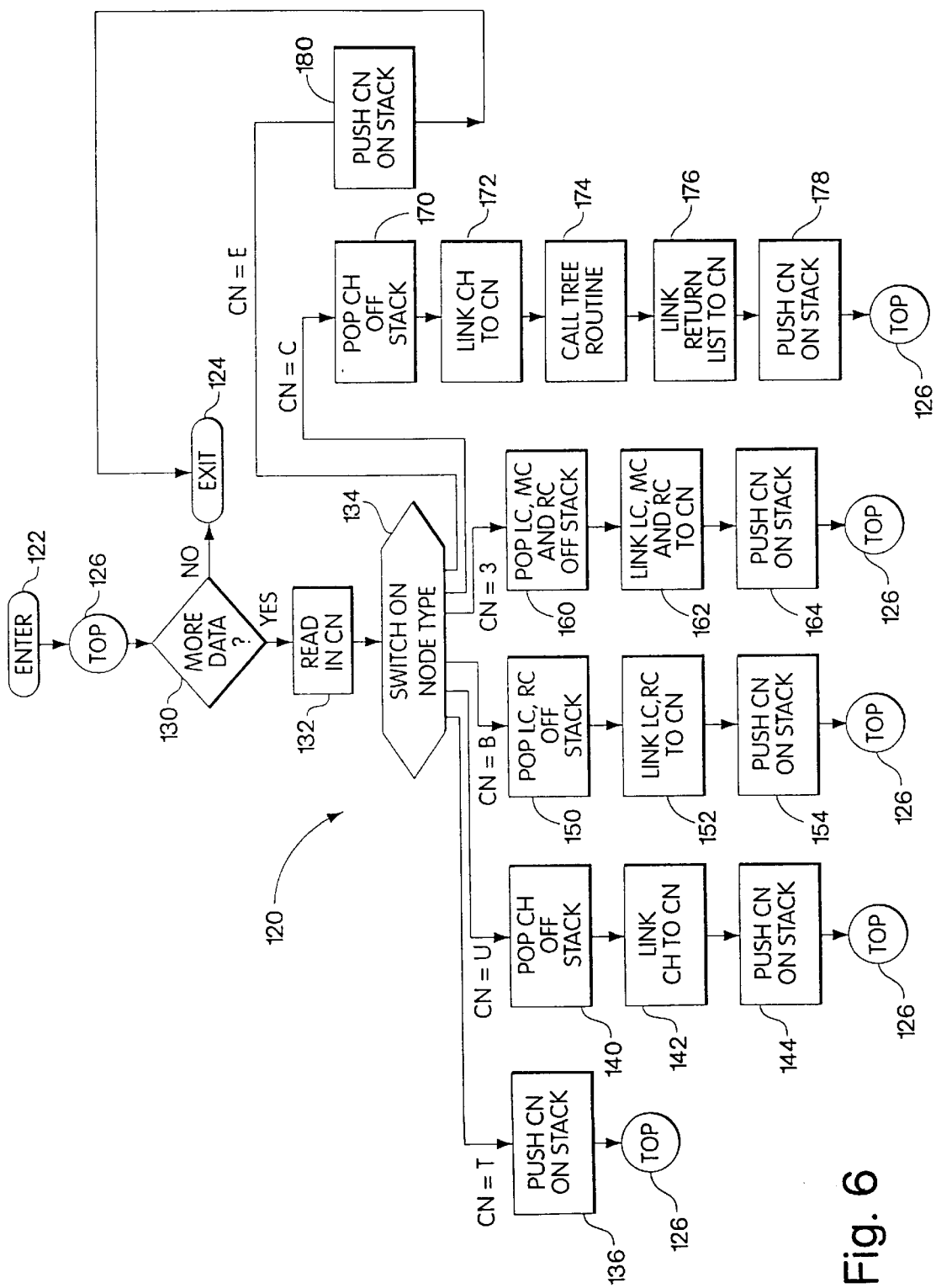
FIG. 6 is a flow chart illustrating steps used to construct the tree data structure of FIG. 5.

Referring to FIG. 6, a flowchart 120 illustrates operation of the tree construction software 62 of FIG. 4 that uses data from the IR data element 64 to provide the IR tree data element 66. The flowchart includes an entry point 122 and an exit point 124. A connector 126 labeled "TOP" is used to simplify the flowchart 120 by decreasing the number of flow lines thereon. All points on the flowchart labeled with the connector 126 represent the same logical point in the flow of the code.

The data that is read from the IR data element 64 and processed by the tree construction software 62 could be stored in a computer file. In other embodiments, data may be stored in computer memory or stored using any one of a variety of means sufficient for providing the IR data element 64. Each node may be represented by a variable length record having conventional type and size indicators. In the embodiment illustrated herein, it is assumed that the data is stored in a conventional computer file with the operands corresponding to a node being at an earlier point in the file than the node itself. For example, if a particular node representing the addition operation has two children representing the first and second operands that are being added, then the three nodes (parent and two children) may be stored in the file with the first and second operands being located sequentially prior to the node indicating the addition operation. Accordingly, for any tree or subtree, the root node may be located in the file following all of the children nodes. In a preferred embodiment, the data from the IR data element 64 is first read into a flat list (such as a linked list or an array). Then the flat list is processed to provide the tree 80. The nodes that are part of the flat list may be the same nodes stored in the tree 80 (i.e., the same data), with the tree 80 being constructed by simply adding links to the nodes in the flat list to form the tree 80. Alternatively, the flat list may be part of the IR data element 64.

Processing for the routine illustrated in FIG. 6 begins at a test step 130 which determines if there is more data to be processed. If not, then processing is complete and control passes to the exit point 124 to exit the tree construction software. Otherwise, control passes to a step 132 where the current node (CN) is read in. The CN represents the node that is processed by the remainder of the software. Note that if a separate flat list of nodes is used, then "reading in" CN may simply refer to examining the next node in the list. Otherwise, the CN may be read directly from the IR data element 64.

Following the step 132 is a step 134 where the node type of the CN is determined. Note that there are many conventional techniques known in the art for associating a type with a portion of data such as, for example, using a unique numeric code to differentiate between types. Once the node type is determined at the step 134, control passes to one of a plurality of code branches that process the particular node type.

If it is determined at the step 134 that the CN is a terminal node, then control passes from the step 134 to a step 136 where the CN is pushed onto a stack. As discussed in more detail below, the tree construction software 62 uses a local stack to construct the tree 80. Following with step 136, control passes back to the beginning of the routine (as indicated by the connector 126) to the steps 130, 132 (discussed above) that check to see if there is more data to be processed and, if so, then read that data into the CN.

If it is determined at the step 134 that the CN is a unary node (i.e., a node with one child), then control passes from the step 134 to a step 140 where the child (CH) of the unary node is popped off the local stack. Note that the child of the unary node would have been read in previously, per the convention adopted for storing the IR data, discussed above. Following the step 140 is a step 142 where the child of the unary node (i.e., the child of the CN) is linked to the CN. Following the step 142 is a step 144 where the CN is pushed onto the local stack. Note that the CN may be a child of another node that will be subsequently read in. Following the step 144, control passes back to the beginning of the routine, as indicated by the connector 126.

If it is determined at the step 134 that the CN is a binary node (i.e., a node having two children), then control passes from the step 134 to a step 150 where the left child (LC) and the right child (RC) of the CN are popped off the local stack. Following the step 150 is a step 152 where the left child and right child are linked to the CN. Following the step 152 is a step 154 where the CN is pushed onto the local stack. Following step 154, control transfers back to the beginning of the routine, as indicated by the connector 126.

If it is determined at the step 134 that the CN is a ternary node, then control transfers from the step 134 to a step 160 where the three children of the ternary node, the left child (LC), middle child (MC), and right child (RC), are popped off the local stack. Following the step 160 is a step 162 where the left child, middle child, and right child are linked to the CN. Following the step 162 is a step 164 where the CN is pushed onto the local stack. Following the step 164, control transfers back to the beginning of the routine, as indicated by the connector 126.

If it is determined at the step 134 that the CN is a combination node, then control transfers from the step 134 to a step 170 where the child node (CH) is popped off the local stack. As discussed above in connection with FIG. 5, a combination node has two children where the first child is a single node and the second child is a list of nodes. In terms of storage of the IR data associated with a combination node, the first child may be stored prior to the combination node but the second child (the list elements) may be stored immediately after the combination node. Note also that, as discussed above, the end of the list is indicated by an end of list node.

Following the step 170 is a step 172 where the child node is linked to the CN. Following the step 172 is a step 174 where the routine is recursively called to process the elements of the list to be attached to the CN. As discussed in detail below, the return from the recursive call to the routine occurs when the end of list indicator is reached. Also, by convention, the routine may return a list containing items remaining on the local stack used by the routine.

Following the step 174 is a step 176 where the list returned by the call to the routine at the step 174 is linked to the CN to become the attached list of the combination node. Note that the call to the routine at step 174 causes each of the elements of the list for the combination node to be processed and placed on the local stack. Accordingly, the list of local stack elements may be returned upon returning from the call to the routine at the step 174. Following the step 176 is a step 178 where the CN (i.e., the combination node) is pushed onto the stack. Following step 178, control passes back to the beginning of the routine, as indicated by the connector 126.

If it is determined at the step 134 that the CN is an end of list indicator node, then control passes from the step 134 to a step 180 where the CN is pushed onto the local stack. Following the step 180, control passes back to the step 124 to return from the routine. Note that, in many instances, the return from the routine at this point is a return from a previous recursive call to the routine that was made when the corresponding combination node (the parent for the current list) was first encountered, as described above in connection with the steps 174, 176.

As discussed above, the instrumentation software 63 shown in FIG. 4 operates on the IR tree data element 66 to provide the instrumented IR tree data element 67. The instrumentation software 63 also uses data from the other instrumentation data element 69 which, as discussed in detail below, includes a plurality of run time instrumentation routines that may be added to the IR tree to facilitate run time debugging. In addition, as discussed in more detail below, the instrumentation software 63 instruments other IR data to provide the other IR data element 68 that includes instrumented versions of IR data. Once the instrumentation software 63 has provided the instrumented IR tree data element 67, the tree deconstruction routine 70 uses the instrumented IR tree data element 67 and the other IR data element 68 to provide the instrumented IR data element 65.

Figure 7:
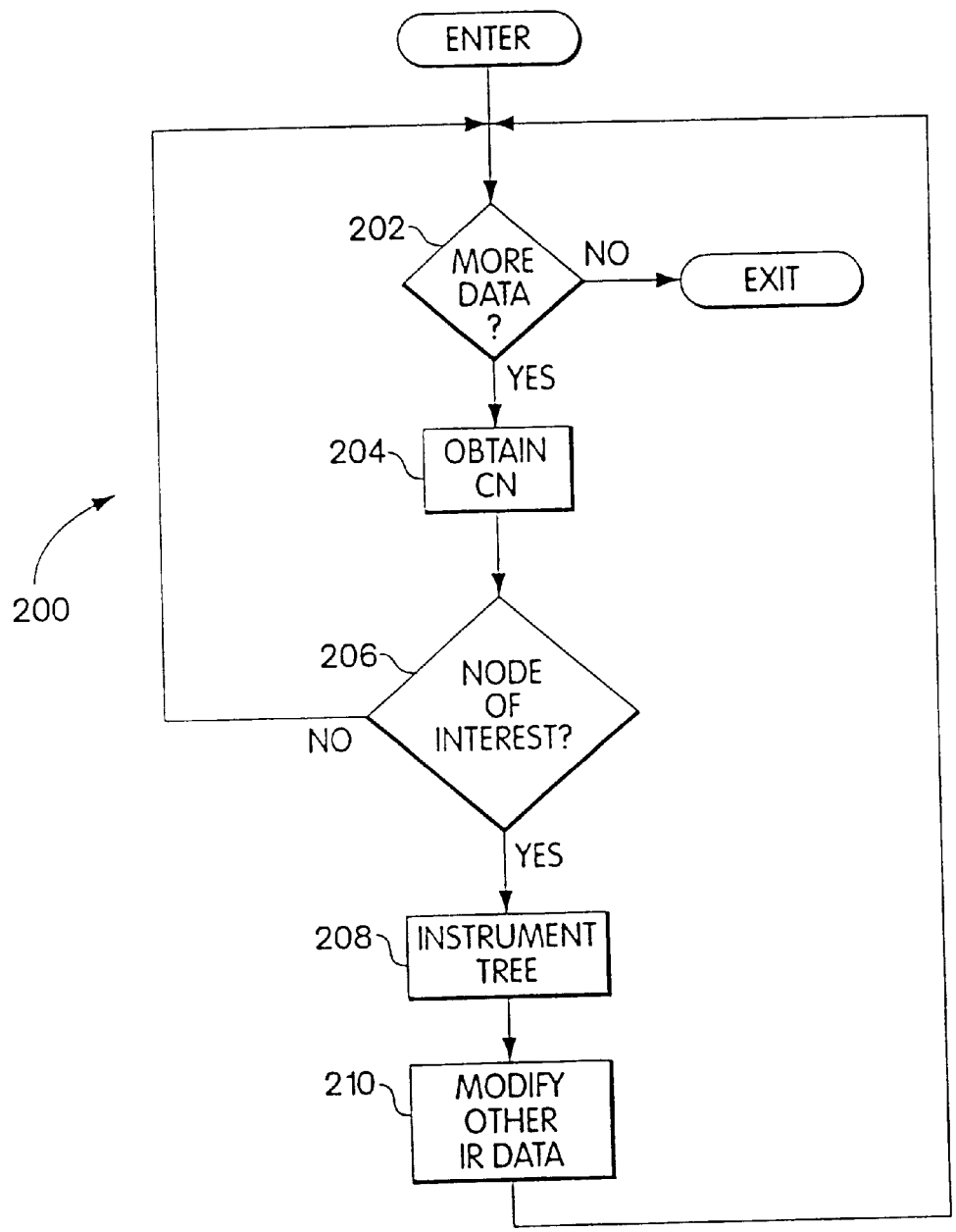
FIG. 7 is a flow chart illustrating instrumentation of the tree data structure of FIG. 5.

Referring to FIG. 7, a flowchart 200 illustrates operation of the instrumentation software 63 of FIG. 4. The instrumentation software 63 examines data found within the IR data element 64 and, in a manner discussed in more detail below, provides instrumentation. Processing begins at a test step 202 where it is determined if there is more data (i.e., more nodes) to examine. Note that the data that is processed could be either directly from the IR data element 64 or could be from the flat list of IR nodes, discussed above, that may be created in connection with creating the IR tree 80. If it is determined at the test step 202 that there is no more data to process (i.e., the end of the list or the end of the file containing the data has been reached), then processing is complete and the routine of FIG. 7 is exited.

If it is determined at the test step 202 that there is more data to be processed, then control passes from the test step 202 to a step 204 where the current node (CN) is obtained. In a manner similar to that discussed above in connection with construction of the IR tree 80, obtaining the CN may include reading the CN directly from the IR data element 64 or simply obtaining the next node in the flat list of nodes that may have been constructed prior to building the IR tree 80.

Following the step 204 is a test step 206 where it is determined if the CN is a node of interest. As discussed in more detail below, a node of interest includes any node that is to be instrumented or which indicates that instrumentation is appropriate. Identifying which nodes are nodes of interest at the test step 206 is discussed in more detail hereinafter.

If it is determined at the test step 206 that the CN is not a node of interest, then control passes from the test step 206 back up to the step 202 where it is determined if there is more data to be processed, as discussed above. Otherwise, if it is determined at the test step 206 that the CN is a node of interest, then control passes from the test step 206 to a step 208 where a portion of the IR tree 80 is instrumented, either by replacing the CN and/or adding additional nodes the near location of the CN in the tree 80. Following the step 208 is a step 210 where other IR data is modified, as appropriate. Following the step 210, control passes back to the step 202 to determine if there is more data to be processed.

Generally, it is possible to instrument any one or any subset of a variety of the nodes found in the IR tree 80. In many instances, however it is useful to instrument memory access instructions in order to detect illegal memory operations at run time. In addition, for many higher-level languages, variables that may be defined locally within a particular code block (such as a function) become undefined once that code block is exited. Accordingly, monitoring the variables of a program that access memory may necessitate monitoring exiting and entering blocks of code where variables become defined and undefined. For instance, a pointer variable may be defined within a particular block of code and used to allocate memory from the heap. If that block of code is exited before the memory is released, this would, in many instances, constitute an error since there would be no way to free the memory allocated using the (subsequently undefined) pointer variable.

In a preferred embodiment, the system described herein determines nodes of interest at the test step 206 by determining if the CN corresponds to one of: a pointer arithmetic operation that compares pointers or does pointer arithmetic, an operation that reads memory locations, an operation that changes memory locations, or an operation that causes variables to become defined or undefined, such as a scope change, a goto statement, a function call or a return from a function call. In the case of memory variable operations, whenever a variable is used to read memory, the run time instrumentation routines determine if the variable corresponds to memory that has been allocated and initialized. Similarly, if a variable is being used to write memory, the run time instrumentation routines determine if the variable corresponds to memory that has been allocated. Pointer comparisons are instrumented since it is often not proper to compare pointers that point to blocks of memory allocated by separate calls to the allocation routine(s). Operations that read or write to memory locations are instrumented to ensure that the memory variable(s) being used point to the memory allocated for the variable(s) during the read or write operation (e.g., an array index does not cause an access to an array to point beyond the end of the array).

Function calls and returns may be instrumented for a variety of purposes, including keeping track of variables becoming defined or undefined in connection with function calls and returns. In addition, note that it is possible to pass a variable pointer to a function and have that pointer be assigned to another variable within the function. These types of operations are instrumented since, even if a local variable is used to allocate memory, if that local variable corresponds to a passed variable, then it may not be improper to return from the function before freeing the memory allocated using the local variable.

Each block of code has a particular "scope" associated therewith. Transition from a block of code having one scope to a block of code having another scope is called a "scope change". One reason scope changing instructions are instrumented is to detect memory leaks (i.e., allocating memory that is not subsequently freed). As discussed above it is an error to allocate memory to a local variable and then return or exit out of the scope which defines the local variable without first freeing the memory or copying a pointer for the memory to a variable that is not going out of scope. Another reason that scope changes are instrumented is to detect read accesses to unitialized variables. Note that associating blocks of code with particular scopes is known in the art. See, for example, a section titled "Representing Scope Information" at pages 438–440 of Aho, Seth & Ullman, *Compilers, Principles, Techniques, and Tools*, published by Addison-Wesley of Reading Mass., 1986.

One possible optimization is to not instrument scope changes that have minimal effect on monitoring variable operations. This optimization may be performed by first determining the scope of each portion of the IR code and then setting an effective scope of appropriate portions of the code to the effective scope of the immediately preceding block of code. In some instances, the block of code that immediately precedes the current block of code is the "parent" block of code. A preceding block of code is said to have a "preceding scope" relative to the current scope. For instance, in some higher level languages, a FOR loop will cause a scope change in connection with transition from the head of the loop to the body of the code that is executed within the loop. Thus, the scope of the head of the FOR loop is the preceding scope of the body of the FOR loop.

An effective scope table indicates the effective scope of each block of IR code. As discussed in more detail below, the effective scope of a portion of IR code is deemed to be the scope of that portion for purposes of instrumenting operations that use program variables. The effective scope table creates a mapping between the actual scope and the effective scope of blocks of the IR code.

Figure 8:
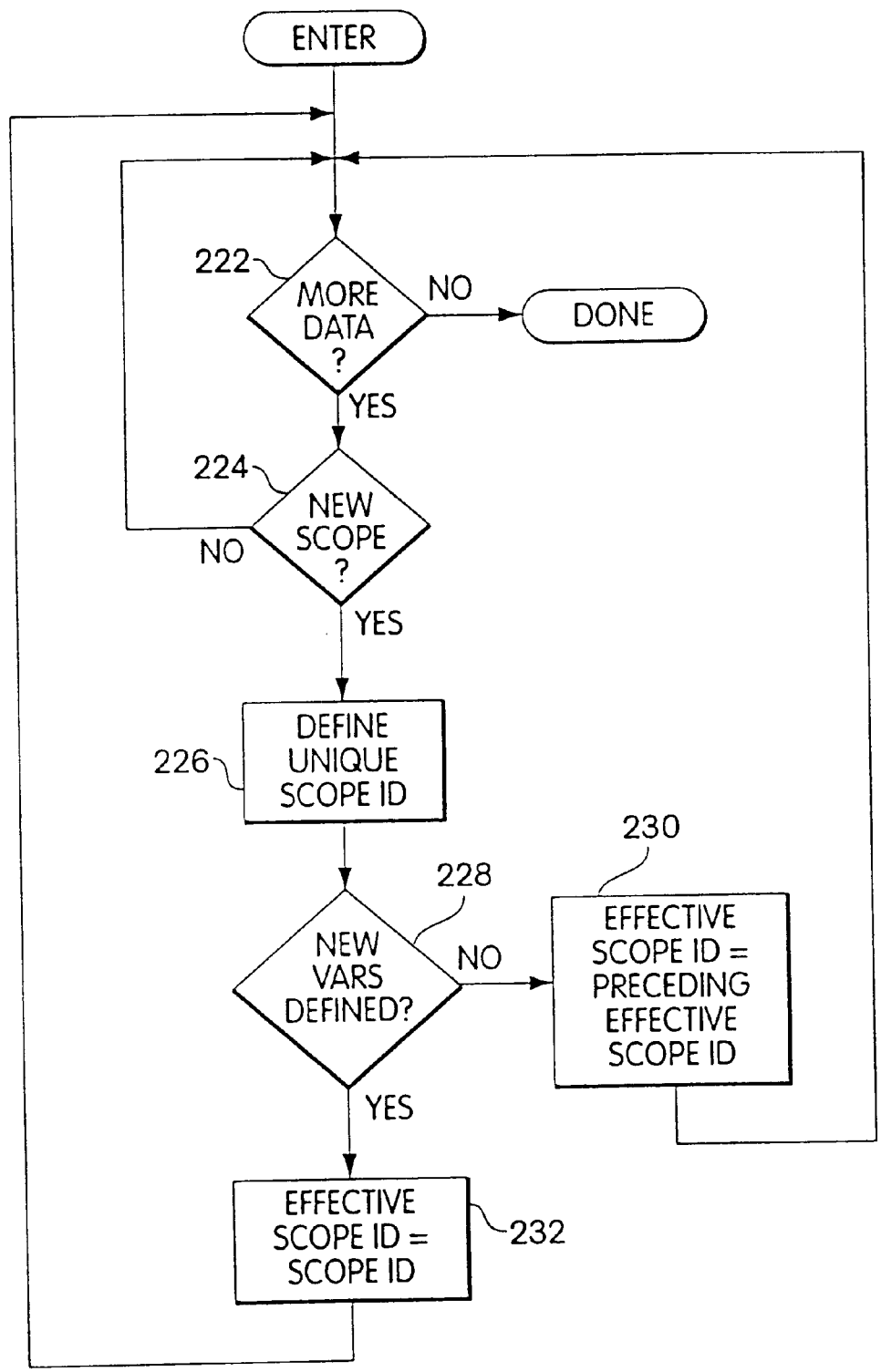
FIG. 8 is a flow chart illustrating construction of an effective scope table used in connection with instrumenting the tree data structure of FIG. 5.

Referring to FIG. 8, a flow chart 220 illustrates using the IR code to construct the effective scope table. Processing begins at a test step 222 which determines if there is more data to be processed, in a manner similar to that discussed above in connection with other processing. If it is determined at the test step 222 that there is no more data, then processing is complete. Otherwise, control passes from the test step 222 to a test step 224 which determines if the data that has been read in and is being processed indicates a scope change. Note that, depending on the specific IR implementation, a scope change may be indicated explicitly within the IR data or may be indicated implicitly, in which case the processing at the test step 224 would use conventional means for detecting a scope change, such as examining the data for the type of instructions that cause a scope change.

If it is determined at the test step 224 that there is no scope change, then control passes back to the test step 222 to determine if there is more data to be processed. Otherwise, if a scope change is detected at the test step 224, then control passes from the step 224 to a step 226 where a unique scope identifier is defined and assigned to the code block being processed. Construction of the effective scope table includes providing a unique scope identifier for each block of IR code having the same scope. Accordingly, one of the entries in the effective scope table is the unique scope identifier associated with each of the IR code blocks.

Following the step 226 is a test step 228 which determines if new variables are being defined within the block of code corresponding to the current scope. The variable definitions may be stored in the IR tree 80 or may be stored elsewhere, depending upon the specific implementation of the IR If no new variables are defined within the current scope, then, for purposes of instrumenting memory variable accesses, it is not necessary to instrument the scope change. Accordingly, if it is determined at the test step 228 that no new variables are defined within the block of code corresponding to the current scope, then control passes from the step 228 to a step 230 where the effective scope of the current block of code is set equal to the effective scope of to the preceding block of code by associating the effective scope of the preceding block with the current scope. Note that setting the effective scope of the current block of code to the effective scope of the preceding block of code indicates that the scope change from the preceding block of code to the current block of code is not especially significant for purposes of instrumenting variable accesses. Note also that the effective scope of a preceding block may have been previously set to the effective scope of the preceding block of the preceding block. In this way, many scopes may be set to the same effective scope.

If it is determined at the test step 228 that new variables are defined within the current block of IR code, then control passes from the step 228 to a step 232 where the effective scope table is modified to indicate that the effective scope of the current block of code is equal to the actual scope assigned to that block of code. Following either the step 230 or the step 232, control passes back to the beginning of the routine. The thus-constructed effective scope table may be used to provide instrumentation optimizations, as discussed below.

Figure 9A:
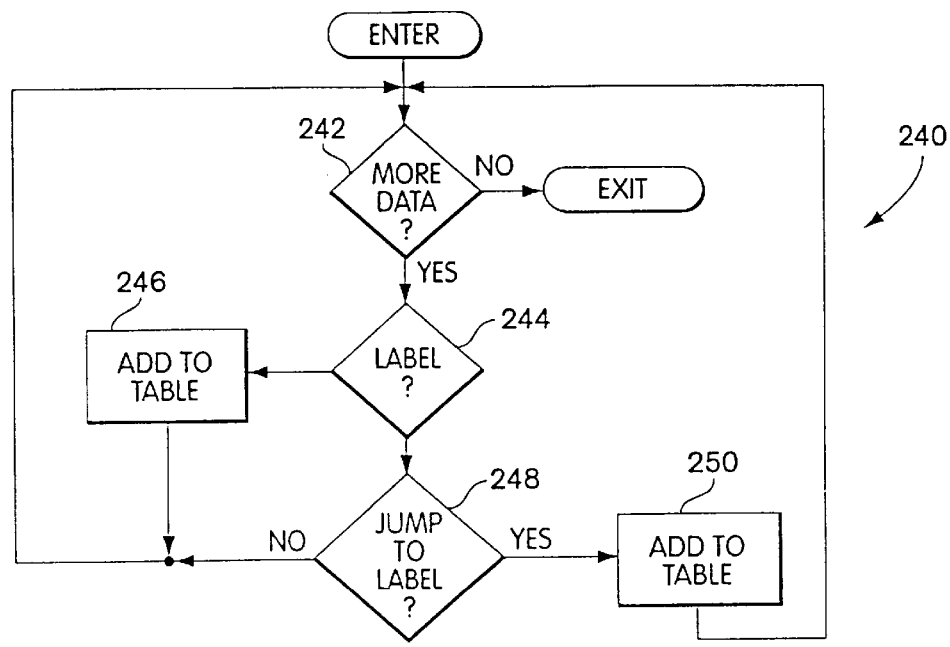
FIGS. 9A and 9B are flow charts illustrating scope optimization used in connection with instrumenting the tree data structure of FIG. 5.

Referring to FIG. 9A, a flow chart 240 illustrates code for identifying labels and jumps to labels within the IR code. Note that, in many conventional IR implementations, symbolic labels are used to identify locations within the code so that control flow instructions within the IR code may jump to those labels. In some instances, a jump to a label could cause a scope change and, therefore, could be instrumented if the jump causes program variables to become defined or become undefined. However, a possible optimization includes identifying labels that do not require instrumentation either because there are no jumps to those labels or because all jumps to those labels are from code having the same effective scope as the code corresponding to the label.

Processing begins at a test step 242 which determines if there is more data to be processed in a manner similar to that discussed above. If there is no more data, then processing is complete. Otherwise, control passes from the test step 242 to a test step 244 which determines if the current IR node being processed is a label for a block of IR code. If so, then control passes from the test step 244 to a step 246 where the label is added to a label table that is used by follow on processing, as discussed in more detail below.

If it is determined at the test step 244 that the data being processed is not a label, then control passes from the step 244 to a test step 248 which determines if the current data being processed includes IR code that jumps to a label. If not, then control passes from the test step 248 back to the step 242 to process additional data. Otherwise, if it is determined at the test step 248 that the current data being processed includes IR code that jumps to a label, then control passes from the step 248 to a step 250, where an entry is made to the label table. Following the step 250, control passes back to the beginning of the routine to process additional data. The processing illustrated in the flowchart 240 creates the label table to identify all labels and all jumps to labels within the IR code. Note that the term "table", as used herein, should be understood in its broader sense to include other equivalent data structures such as linked lists, storage in a temporary file, etc., familiar to one of ordinary skill in the art.

Figure 9B:
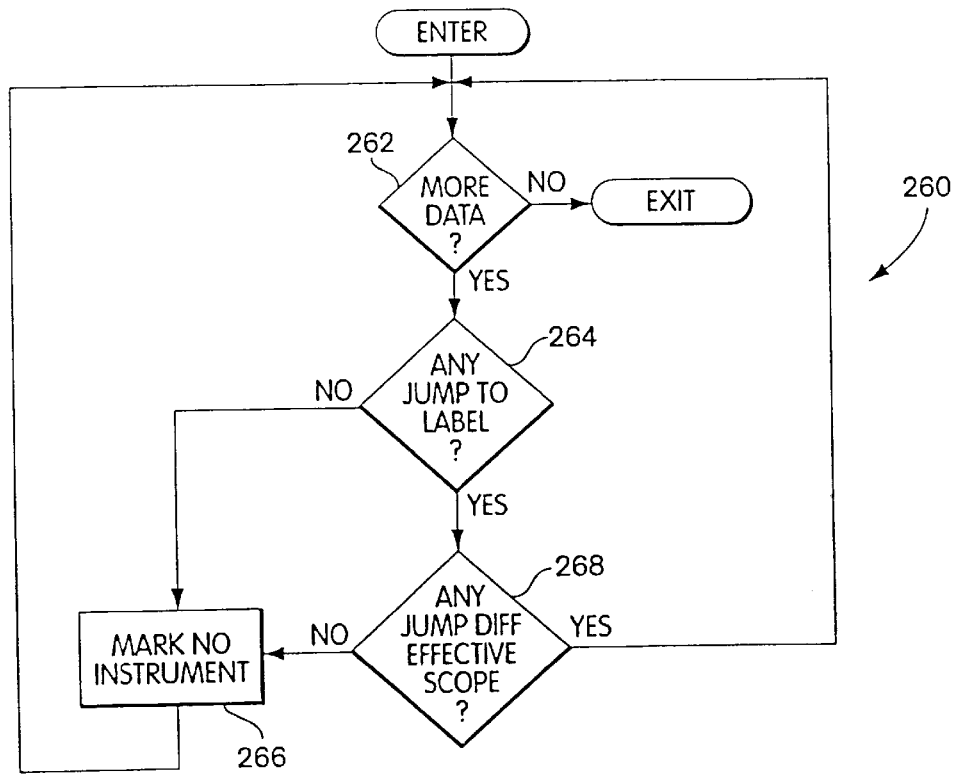

Referring to FIG. 9B, a flow chart 260 illustrates optimization operations that use the label table. Each label that is identified in the label table is examined to determine if there are any jumps to that label or if any of the jumps to the label are from IR code blocks having a different effective scope. Processing begins at a test step 262 which, in a manner similar to that discussed above, determines if there is more data to be processed. Note that, in this instance, the test for more data at the test step 262 is directed to processing each of the label entries in the label table.

If it is determined at the step 262 that there is no more data (i.e., there are no more labels to be processed), then processing is complete. Otherwise, if there are more labels to be processed, then control passes from the test step 262 to a test step 264 which examines the label table to determine if there are any jumps to the current label being processed. Note that, generally, it is possible for the compiler to generate IR code having labels that are ultimately not used (i.e., there is no IR code that jumps to the labels). Accordingly, if such labels exist, they are detected at the test step 264 and control passes to a step 266 where the label is marked (in a conventional manner) to indicate that the label is not to be instrumented. Following the step 266, control passes back to the beginning of the routine.

If on the other hand, it is determined at the test step 264 that there are jumps to the label being processed, then control passes from the step 264 to a test step 268 where it is determined if any of the jumps to the label are from IR code having a different effective scope than that of the label. Note that at the steps 246, 250 of FIG. 9A, the label table entries may be made to include the effective scope (from the effective scope table) of IR code corresponding to the labels and the jumps to the labels. Accordingly, at the step 268, the effective scope of the IR code corresponding to the label is compared with the effective scopes of all of the code containing jumps to the label. If it is determined at the step 268 that none of the jumps to the label are from IR code having a different effective scope than the code associated with the label, then control passes from the step 268 to the step 266, where the label is marked to indicate that the label is not to be instrumented. Since the effective scope tracks variables becoming defined and undefined within a code block and between different code blocks, then marking certain labels at the step 266 provides a worthwhile optimization when instrumenting code in connection with run time variable accesses.

If it is determined at the step 268 that there are jumps to the label that cause a change in effective scope, then control passes from the test step 268 back to the beginning of the routine. Once all the labels have been thus marked, it is possible to perform the remainder of the processing indicated by the step 206 in FIG. 7 where the nodes of interest are identified for subsequent instrumentation. Note that it is possible to use a boolean variable to indicate whether a label node is to be instrumented.

Figure 10:
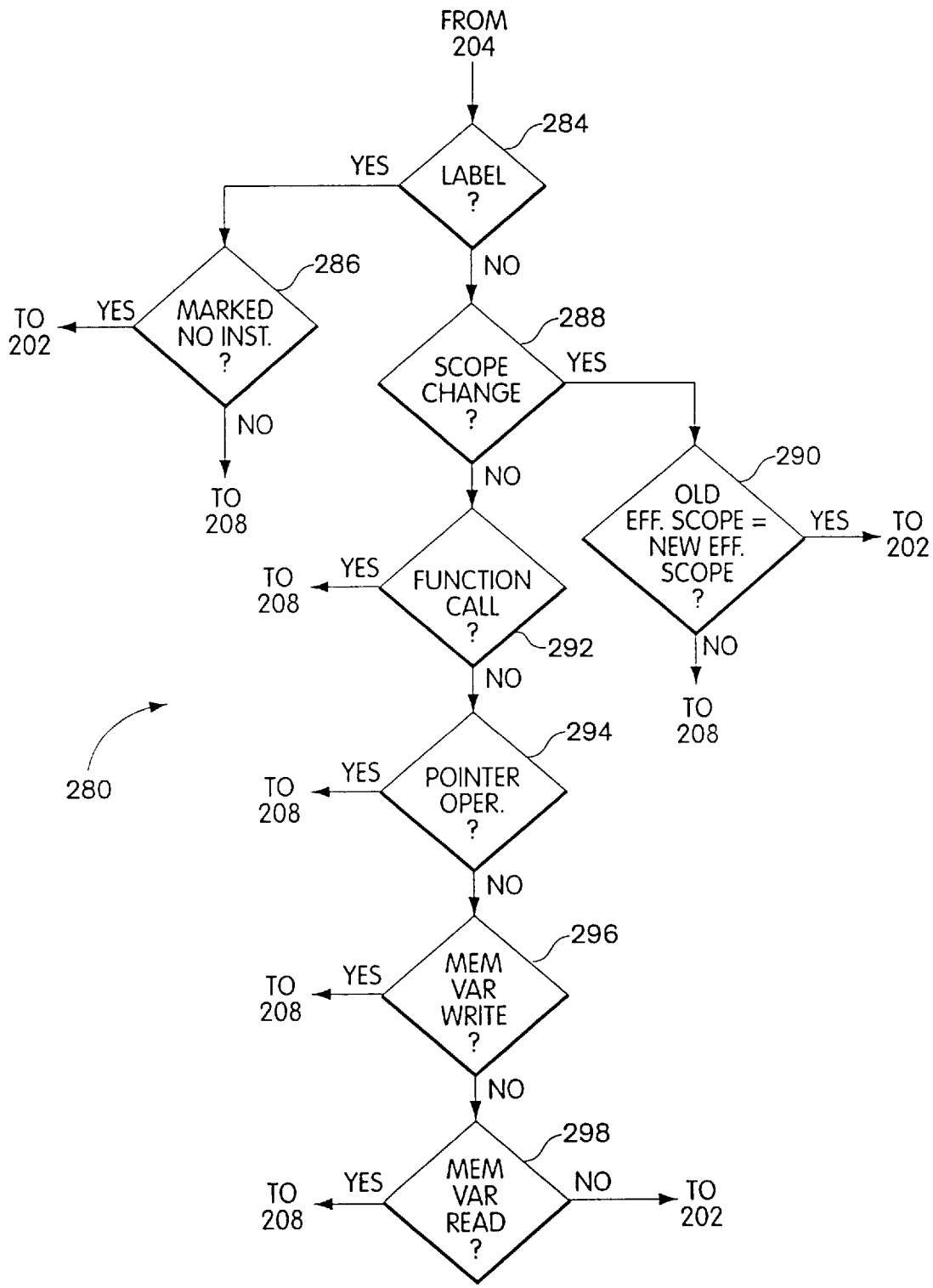
FIG. 10 is a flow chart illustrating in detail a portion of the flow chart of FIG. 7 where nodes are selected for instrumentation.

Referring to FIG. 10, a flowchart 280 illustrates a portion of the processing at the step 206 of FIG. 7 that determines which nodes in the IR code are to be instrumented. Processing begins at a test step 284, which is reached from the step 204 of FIG. 7. At the test step 284, it is determined if the data being processed corresponds to a label in the IR code. If so, then control passes from the test step 284 to a test step 286 to determine if the label has been marked to indicate that the label is not to be instrumented, as discussed above in connection with FIGS. 9A and 9B. If it is determined at the test step 286 that the label being processed has been marked to indicate that the label is not to be instrumented, then control passes from the test step 286 to the step 202 of FIG. 7. Otherwise, if it is determined that the test step 286 that the label is to be instrumented, then control passes from the step 286 to the step 208 of FIG. 7 where the IR tree 80 is instrumented.

If it is determined at the test step 284 that the data being processed is not a label, then control passes from the step 284 to a step 288 where it is determined if the data being processed indicates a scope change. If so, then control passes from the step 288 to a test step 290 to determine if the old effective scope (i.e., the effective scope before the scope change) equals the new effective scope (i.e., the effective scope after the scope change). The effective scope is discussed above in connection with construction of the effective scope table. If it is determined that the scope changed detected at the test step 288 does not cause a change in the effective scope, then control passes from the test step 290 to the step 202 of FIG. 7. Otherwise, if it is determined at the test step 290 that the old effective scope does not equal the new effective scope, then control passes from the step 290 to the step 208 of FIG. 7 where the tree 80 is instrumented.

If it is determined at the step 288 that the data being processed does not cause a scope change, then control passes from the step 288 to a test step 292 where is determined if the data being processed is a function call. If so, then control passes from the test step 292 to the step 208 of FIG. 7. Otherwise, control passes from the test step 292 to a test step 294 which determines if the data being processed is a pointer operation. If so, then control passes from the test step 294 to the step 208 of FIG. 7. Otherwise, control passes from the test step 294 to a test step 296 where it is determined if the data being processed is a memory write operation (i.e. an operation with a program variable causing a write to memory). If so, then control passes from the test step 296 to the step 208 of FIG. 7. Otherwise, control passes from the step 296 to a test step 298 which determines if the data being processed relates to a memory read (i.e., is an operation with a program variable causing a read from memory). If so, then control passes from the test step 298 to the step 208 of FIG. 7. Otherwise, control transfers from the step 298 to the step 202 of FIG. 7.

FIG. 10 illustrates an embodiment of the invention where the instructions being instrumented relate to memory variable accesses and scope changes. In other embodiments of the invention, it is possible to instrument other types of IR instructions, depending upon which instructions are deemed appropriate for monitoring program operation at run time. For example, it may be possible to add instrumentation to monitor run time performance of the program. Other examples of possible uses of instrumentation include, but are not limited to, code coverage analysis and run time error handling.

Instrumenting memory variable accesses and scope changes, as disclosed herein, facilitates uncovering program errors relating to memory read and write operations that occurred during run time. Note that the specific IR operations, and the arguments thereof, vary depending upon the particular implementation of the IR In addition, as discussed above, the choice of which operations to instrument varies depending upon the needs of the user of the instrumentation program.

The step 208 of instrumenting the IR tree, which is shown as FIG. 7, involves adding nodes to the tree that assist in the performance of the run time instrumentation. As discussed in more detail below, each of the specific run time instrumentation routines that is provided may include a function that is called to perform the instrumentation operation. Note that the instrumentation calls are added in a way that has no net effect on the underlying, uninstrumented, program. That is, the behavior of the IR code with the run time instrumentation routines added thereto has to be the same as the behavior of the original IR code without the instrumentation routines added. Thus, the instrumentation routines may add new variables, but do not change any of the program variables except in instances where the value of a program variable is undefined. The additional nodes, instrumentation function calls, etc. may be provided by the instrumentation data element 69 shown in FIG. 4.

Figure 11A:
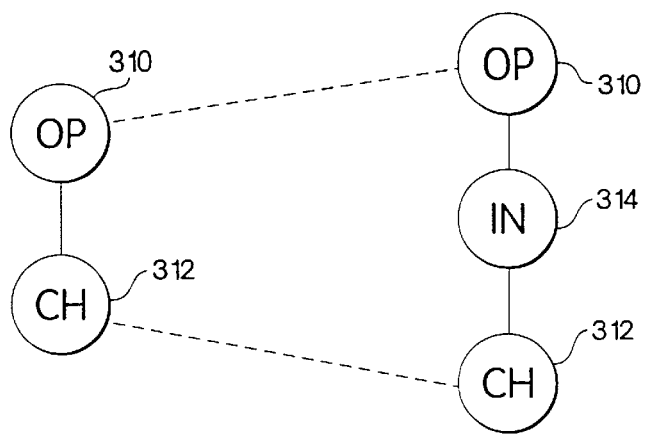
FIGS. 11A, 11B, and 11C illustrate insertion of nodes in connection with instrumentation of the tree data structure of FIG. 5.

Referring to FIG. 11A, a portion of an IR tree is shown containing a unary operation node 310 and a child node 312 thereof. The operation node 310 represents a node of interest that is to be instrumented. The child node 312 represents the sole child of the operation node 310. In order to instrument the operation node 310, a run time instrumentation node 314 is interjected between the operation node 310 and the child node 312. The run time instrumentation node 314 may be a function call to a run time instrumentation function that uses the child node 312 as one of the arguments and returns the value of the child node 312 from the function call to make the value available for the operation node 310. Interjecting the run time instrumentation node 314 between the operation node 310 and the child node 312 in this manner is virtually transparent to the operation node 310, since the value returned by the run time instrumentation node 314 is the value of the child node 312. Note that other arguments may be provided in a conventional manner to the function corresponding to the run time instrumentation node.

Figure 11B:
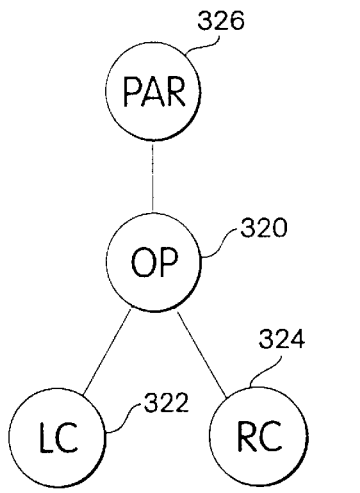

Refer to FIG. 11B, a binary operation node 320 has a left child 322, a right child 324, and a parent node 326. If the operation node 320 is a node of interest, then it may be instrumented by interjecting various nodes that are effectively transparent to the operation node 320 as well as effectively transparent to the left child 322, the right child 324 and the parent node 326.

Figure 11C:
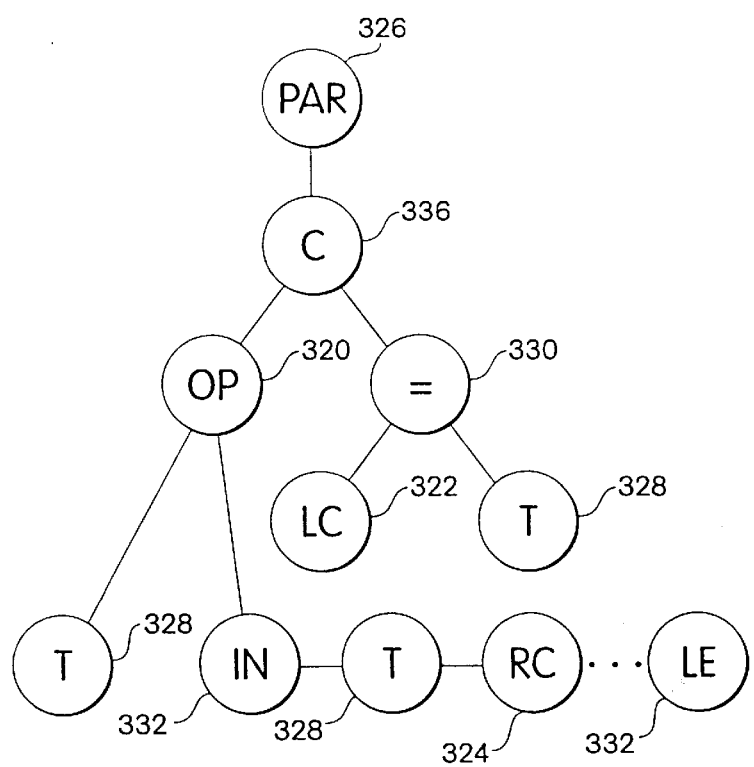

Referring to FIG. 11C, the operation node 320 is instrumented by adding a variety of other nodes. One of the other nodes that is added is a temporary node 328 that is used to store the value of the left child 322. An assignment node 330 is used to assign the value that results from evaluating the left child 322 to the value of the temporary node 328. As discussed below, right subtree is evaluated before the left subtree. Thus, the operation that evaluates the value of the left child and assigns the value to the temporary node 328 will occur before other operations shown in FIG. 11C.

An instrumentation node 332 is represented in the subtree of FIG. 11C as a function having arguments that include the temporary node 328 and the right child 324. Since the arguments to the function that corresponds to the instrumentation node 332 are illustrated as a list, then a list end node 334 is shown at the end of the list. Other arguments to the instrumentation node 332, as well as arguments to the instrumentation node 314 of FIG. 11A may include a variety of other conventional compile time and run time parameters that facilitate debugging.

The function defined by the instrumentation node 332 returns the result of evaluating the right child 324. Thus, the next operation is the operation of the instrumented node 320, which receives the value of the temporary node 328 and the value of the instrumentation function 332. Note that, as discussed above, the value of the temporary node 328 is the value of the left child 322 and the value of the function defined by the instrumentation node 332 is the value of the right child 324. Thus, the operation node 320 is provided with values for children that are the same as those provided to the operation node 320 shown in FIG. 11B. The node labeled "C" 336 of FIG. 11C simply causes execution of the right sub-tree (in this case having a root node 330 that does the assignment of the value of the left child 322 to the temporary node 328) followed by the operation of the left sub-tree (in this case the operation being instrumented 320). The node labeled "C" 336 provides the value derived from the operation node 320 to the parent node 326. Thus, the parent node 326 in FIG. 11C receives the same value provided to the parent node 326 in the configuration show in FIG. 11B. Instrumentation of the binary node illustrated in FIGS. 11B and 11C is expandable to ternary and to nodes having even more children using this same basic methodology described herein.

The run time instrumentation code may be implemented by using a separate set of routines (such as a DLL under the Windows environment) that is linkable to the code being instrumented via the function calls provided to the IR code in the course of instrumentation. In a preferred embodiment, the function calls are performed by indirectly calling functions that are initially set to an initialization routine that initializes the run time instrumentation system. The initialization routine determines if an executable library corresponding to the run time instrumentation routine is available. If not, then the addresses of the functions that are called indirectly by the indirect function calls added by instrumentation are set to "stub" routines that simply return without executing anything. Accordingly, even if the user program has been instrumented, if the run time instrumentation program is not also available during run time, then the instrumented code will simply return from the instrumentation function calls.

If, on the other hand, the initialization routine determines that the executable library for providing instrumentation during run time is available, then the addresses of the functions that are called indirectly by the instrumentation nodes are set to the instrumentation routines. The run time instrumentation routines that are used depend on the nature of the IR code being instrumented. Generally, the instrumentation routines may be fairly conventional and test for run time error conditions such as memory leaks (i.e., a scope change that causes a pointer variable to become undefined prior to freeing the allocated memory associated with the pointed variable). Other detected errors may include memory write operations that use variables that do not point to memory that is allocated to the variable, memory read operations that use memory variables that do not point to memory that is either allocated for the variable or, if allocated, then is not initialized. In addition, modifications to pointer variables may be instrumented to ensure that the pointer variables point to the proper allocated block of memory. Other run time instrumentation routines may test and compare the size of variables in connection with a data read from one memory location into another, test for indirect calls to assure that the pointer used points to executable code, and test that pointers that are compared are allocated to the same block of memory.

Once the IR tree 80 has been instrumented in the manner discussed above to create the instrumented IR tree data element 67, the tree deconstruction software 70 of FIG. 4 collapses the IR tree stored in the instrumented IR tree data element 67 and uses the other IR data element 68 to provide the instrumental IR Data Element 65. Collapsing the IR tree back into a flat file is a simple matter of using the conventional post order traversal algorithm to first write the right child sub-tree of each node, then the left child sub-tree, then the actual node. For the combo node, after the child tree is written, the list is processed, treating each item in the list as a top-level node in its own tree. This process is essentially the inverse of the process used to construct the IR tree, discussed above.

The other IR data element 68 shown in FIG. 4 may include a global symbol table that contains locations of each function contained in the IR code. Note that since IR code is being supplemented (i.e., increased in size) by the instrumentation process, then generally, the location of each of the functions within the IR code is likely to move. The locations of each of the functions are stored in the other IR data element 68 and are written back to the other IR data element 68 as the IR tree 80 is collapsed into a flat list by the tree deconstruction software 70 shown in FIG. 4. Note that global function symbols within the global symbol table, and corresponding functions within the IR tree, may be correlated in a conventional manner by using symbol keys that cross-reference items between the IR code and the items in global symbols table.

Once the instrumented IR data element 65 is provided, then, as shown in FIG. 3, the compiler 42 may continue the compile process by accessing the instrumented IR data element 65 to provide the object code 46. Instrumenting the IR code in this way is virtually transparent to the compiler 42 since the IR data element 64 and the instrumented IR data element 65 have virtually the same structure. The thus-provided object code 46 contains the additional nodes added during instrumentation, including the run time function calls that call the run time debugging routines.

During execution of the object code, errors may be indicated by the run time debugging routines in any one of a variety of conventional manners, including providing an indication on the screen and stopping execution of the code when the error occurs, logging errors to a file, or any one of a variety of other ways for indicating to a user that a run time error condition, or a potential run time error condition, has occurred.

Other embodiments also exist. Described below are methods of automatically editing the executable byte code representation of a computer program or other methods for generating instrumented byte code. In one embodiment, the byte code is altered by the addition of new instructions and/or the deletion or modification of existing instructions.

Byte code is a generic term for a family of binary (i.e., non-textual) file formats for computer software programs created by compiling source code written in a computer programming language. Byte code is a format that is usually independent of the source language from which it was compiled, and which is intended to be independent of any computer hardware and/or operating system on which it might run. Byte code programs are executed by a software program sometimes referred to as a virtual machine, byte-code interpreter or p-code interpreter, a separate version of which must be implemented for each computer hardware and/or operating system.

One objective of the editing process is to alter the program to facilitate the gathering of diagnostic and statistical information on the program when it is executed; i.e., dynamic analysis. This allows the program's internal state to be monitored for variety of purposes. These purposes include, but are not limited to: diagnosing error conditions that occur at run time, creating a record of the inner details of program execution, measuring program execution to provide code coverage analysis and performance profiling, or providing additional run time error or exception handling.

Another objective of the editing process is to examine the byte code according to various heuristics; i.e., static analysis. Through static analysis, several types of useful information may be derived. These include, but are not limited to: code metrics and complexity analysis, usage information (including library usage), and enhanced symbolic information for debugging.

Static analysis also makes it possible to detect some types of errors that might not be caught at runtime, since it is difficult to guarantee that all code will actually be executed under all circumstances. These errors include, but are not limited to: improper parameter lists passed to functions, methods or procedures, and use of uninitialized variables.

There are many different ways to instrument byte code. In one embodiment, the editing is performed automatically as a separate post-compile process before the byte code is executed. In another embodiment, the editing is performed automatically by the run time environment itself, which has been modified to alter the code before it is executed. In a third embodiment, the final stage 55 of the compiler 42 shown in FIG. 3 generates instrumented byte code from the instrumented IR data 65 rather than generating the object code 46, as described above.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

We claim:

1. A method of instrumenting a computer program, comprising:
(a) examining an initial intermediate representation of the program;
(b) selecting portions of the initial intermediate representation for instrumentation;
(c) instrumenting the portions to provide instrumented portions; and
(d) converting the instrumented portions into byte code, wherein selecting the portions includes choosing portions of the initial intermediate representation corresponding to: pointer arithmetic operations, operations that reads memory locations, operations that change memory locations, and operations that causes program variables to become defined or undefined within the program.

2. A method according to claim 1 wherein instrumenting the portions includes adding run time code that provides a user with an indication when a run time error occurs.

3. A method of instrumenting a computer program, comprising:
(a) examining an initial intermediate representation of the program;
(b) selecting portions of the initial intermediate representation for instrumentation;
(c) instrumenting the portions to provide instrumented portions;
(d) converting the instrumented portions into byte code; and
(e) prior to converting the instrumented portions to byte code, creating an intermediate representation tree of nodes corresponding to intermediate representation operations and operands of the initial intermediate representation, the nodes being interconnected according to a logical relationship between the operators and the operands, wherein instrumenting the portions includes modifying the intermediate representation tree.

4. A method according to claim 3, further comprising:
(f) following instrumenting the portions by modifying the intermediate representation tree and prior to converting the instrumented portions, transforming the tree into an instrumented intermediate representation that is structurally equivalent to the initial intermediate representation.

5. A method according to claim 3, wherein creating the intermediate representation tree includes interconnecting the nodes so that children nodes of an operator are operands thereof.

6. A method according to claim 5, wherein creating the intermediate representation tree includes placing the children nodes on a local stack and then popping the children nodes off the local stack to connect the children nodes to parents thereof.

7. A method of instrumenting a computer program, comprising:
(a) examining an initial intermediate representation of the program;
(b) selecting portions of the initial intermediate representation for instrumentation;
(c) instrumenting the portions to provide instrumented portions;
(d) converting the instrumented portions into byte code;
(e) prior to converting the instrumented portions, creating an effective scope table that correlates a unique scope identifier for each block of intermediate representation code contained within the initial intermediate representation to an effective scope identifier that indicates whether new program variables are defined within a each block of intermediate representation code; and
(f) in response to a first block of the intermediate representation code having a first effective scope identifier not equal to a second effective scope identifier of a second block of the intermediate representation code that precedes the first block of the intermediate representation code, selecting for instrumentation a portion of the intermediate representation code corresponding to a transition between the first and second blocks.

8. A method of instrumenting a computer program, comprising:
   (a) examining an initial intermediate representation of the program;
   (b) selecting portions of the initial intermediate representation for instrumentation;
   (c) instrumenting the portions to provide instrumented portions;
   (d) converting the instrumented portions into byte code;
   (e) prior to converting the instrumented portions, creating an effective scope table that correlates a unique scope identifier for each block of intermediate representation code contained within the initial intermediate representation to an effective scope identifier that indicates whether new program variables are defined within a each block of intermediate representation code; and
   (f) in response to a first block of the intermediate representation code containing a label and having associated therewith a first effective scope identifier not equal to a second effective scope identifier of a second block of the intermediate representation code containing a control flow instruction to the label, selecting for instrumentation a portion of the intermediate representation code corresponding to a transition between the control flow instruction and the label.

9. A method of instrumenting a computer program, comprising:
   (a) examining an initial intermediate representation of the program;
   (b) creating an intermediate representation tree of nodes corresponding to intermediate representation operations and operands of the initial intermediate representation, the nodes being interconnected according to a logical relationship between the operations and the operands;
   (c) selecting portions of the initial intermediate representation for instrumentations;
   (d) instrumenting the portions by modifying the intermediate representation tree with run time instrumentation code;
   (e) using the intermediate representation tree to create an instrumented intermediate representation that is structurally equivalent to the initial intermediate representation; and
   (f) converting the instrumented intermediate representation to byte code.

10. A method according to claim 9, wherein selecting the portions includes choosing portions of the initial intermediate representation corresponding to pointer arithmetic operations, operations that reads memory locations, operations that change memory locations, and operations that causes program variables to become defined or undefined within the program.

11. A method according to claim 9, wherein creating the intermediate representation tree includes interconnecting the nodes so that children nodes of an operator are operands thereof.

12. A method according to claim 9, wherein creating the intermediate representation tree includes placing the children nodes on a local stack and then popping the children nodes off the local stack to connect the children nodes to parents thereof.

13. A method according to claim 9, further comprising:
   (g) creating an effective scope table that correlates a unique scope identifier for each block of intermediate representation code contained within the initial intermediate representation to an effective scope identifier that indicates whether new program variables are defined within a each block of intermediate representation code; and
   (h) in response to a first block of the intermediate representation code having a first effective scope identifier not equal to a second effective scope identifier of a second block of the intermediate representation code that precedes the first block of the intermediate representation code, selecting for instrumentation a portion of the intermediate representation code corresponding to a transition between the first and second blocks.

14. A method according to claim 9, further comprising:
   (g) creating an effective scope table that correlates a unique scope identifier for each block of intermediate representation code contained with the initial intermediate representation to an effective scope identifier that indicates whether new program variables are defined within a each block of intermediate representation code; and
   (h) in response to a first block of the intermediate representation code containing a label and having associated therewith a first effective scope identifier not equal to a second effective scope identifier of a second block of the intermediate representation code containing a control flow instruction to the label, selecting for instrumentation a portion of the intermediate representation code corresponding to a transition between the control flow instruction and the label.

15. A computer program instrumenter, comprising:
   (a) examining means for examining an initial intermediate representation of the program;
   (b) creating means, coupled to the examining means, for creating an intermediate representation tree of nodes corresponding to intermediate representation operations and operands of the initial intermediate representation, the nodes being interconnected according to a logical relationship between the operations and the operands;
   (c) selecting means, coupled to the examining means, for selecting portions of the initial intermediate representation for instrumentations;
   (d) instrumenting means, coupled to the creating means and the selecting means, for instrumenting the portions by modifying the intermediate representation tree with run time instrumentation code;
   (e) tree means, coupled to the instrumenting means, for using the intermediate representation tree to create an instrumented intermediate representation that is structurally equivalent to the initial intermediate representation; and
   (f) means, coupled to the tree means, for converting the instrumented intermediate representation to byte code.

16. A computer program instrumenter,, according to claim 15, wherein the portions that are selected by the selecting means includes intermediate representation code corresponding to: pointer arithmetic operations, operations that reads memory locations, operations that change memory locations, and operations that causes program variables to become defined or undefined within the program.

17. A computer instrumenter, according to claim 15, wherein the nodes of the intermediate representation tree are interconnected so that children nodes of an operator are operands thereof.

* * * * *